May 3, 1966     I. P. THOMPSON ETAL     3,249,349
APPARATUS FOR ROUND BAR SCARFING

Original Filed Feb. 4, 1958     4 Sheets-Sheet 1

INVENTORS
IVAN P. THOMPSON
WILLIAM C. WEIDNER
ALFRED J. MILLER
BY Richard S. Shreve
ATTORNEY

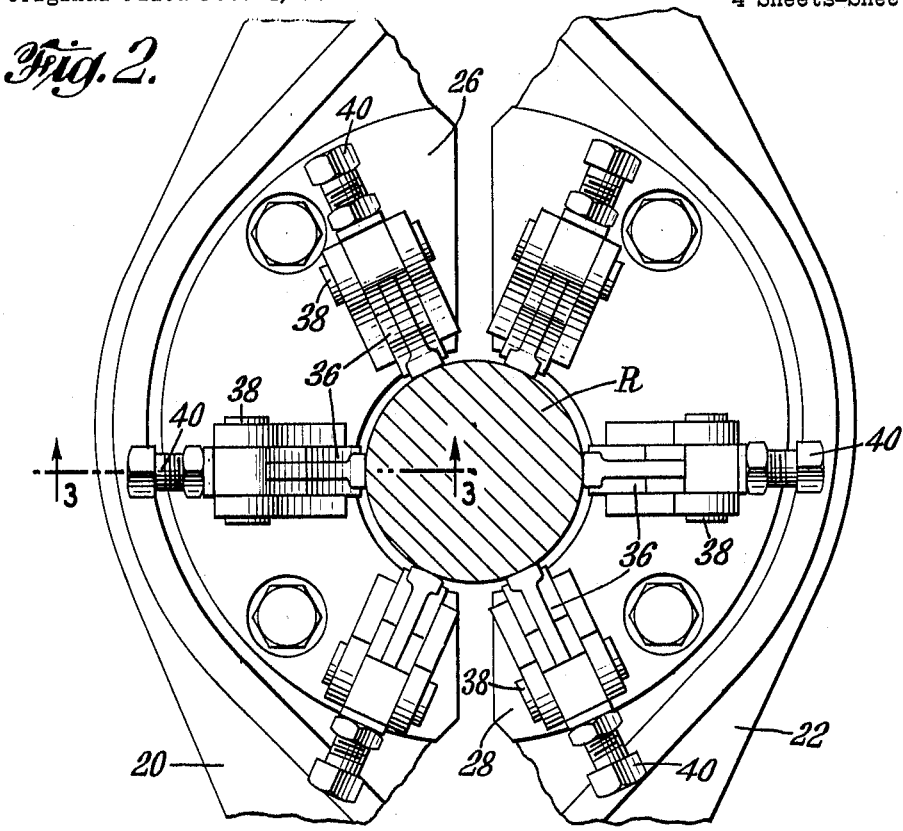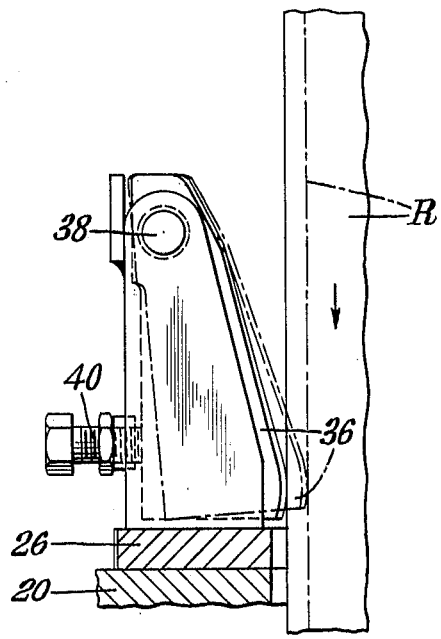

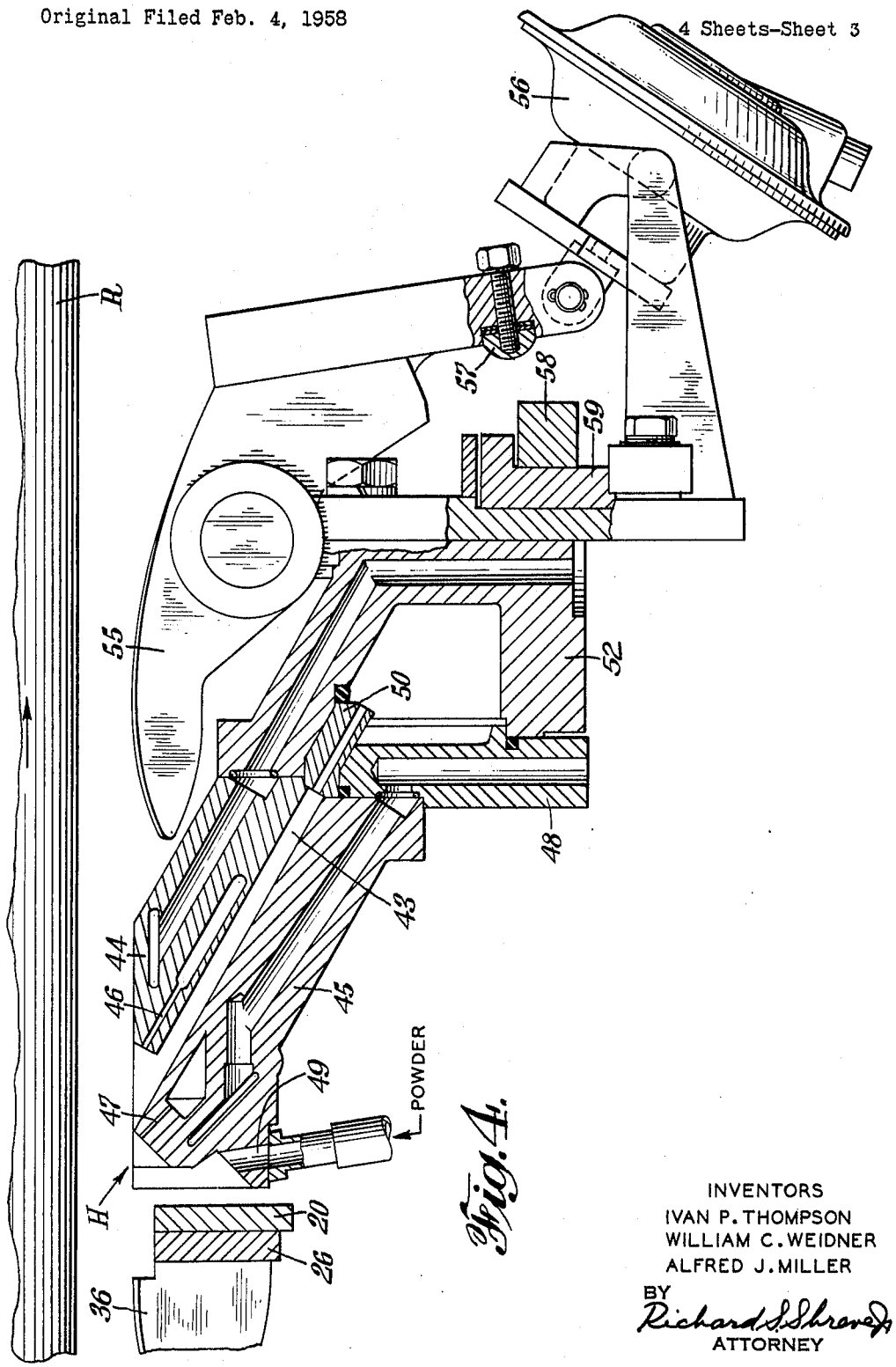

3,249,349
APPARATUS FOR ROUND BAR SCARFING
Ivan P. Thompson, Hillside, William C. Weidner, Summit, and Alfred J. Miller, Westfield, N.J., assignors to Union Carbide Corporation, a corporation of New York
Continuation of application Ser. No. 35,839, June 13, 1960, which is a continuation of application Ser. No. 713,201, Feb. 4, 1958. This application Oct. 31, 1962, Ser. No. 236,183
2 Claims. (Cl. 266—23)

This application is a continuation of application Serial No. 35,839, now abandoned, which was in turn a continuation of parent application Serial No. 713,201, filed February 4, 1958 and now abandoned.

This invention relates to round bar scarfing, and more particularly to method and apparatus for thermochemically removing metal from the surface of metal bars having cross sections of curved contours, and constitutes an improvement on the inventions disclosed in Smith Patent No. 2,472,960 and Thompson et al. Patent No. 2,745,475.

In the scarfing of rectangular billets, the billet is surrounded by four scarfing heads which are adjustably or yieldably mounted to take care of different sizes of billet or of cambers or hooks on the billet passing therethrough. The relative movement of the flat heads is permitted by the corners of the billet. This expedient is not feasible with round bars, because relatively movable heads or separable segments would cause ridges therebetween in the surface of a round workpiece which has no corners.

It is therefore an object of the present invention to center and guide the round bar into and through a conically slotted desurfacing head. Other objects are to introduce adjuvant powder through the preheat flames into the reaction zone on a round bar for quick starting or for scarfing refractory metal round bars.

Other objects are to provide method and apparatus for scarfing round bars rapidly in one operation, with an improved finish, at less cost, with uniform removal of metal even when the bar is out of round or has slight hooks or cambers, and which can be fitted directly into the production line.

According to the present invention, round bars are scarfed by discharging from a conically slotted scarfing head a conical stream of oxidizing gas in a zone extending around the round workpiece, discharging an annular row of preheat flames concentric with said stream against said zone, and discharging an annular row of jets of gas borne adjuvant powder concentric with said stream and preheat flames against said preheated zone.

The scarfing head has conical rings forming a conical oxidizing gas slot, and a separate orifice ring for supplying oxidizing gas to the entrance end of said slot.

In the drawings:

FIG. 2 is a detail of the centering guides shown in FIG. 1;

FIG. 3 is a section taken along the lines 3—3 of FIG. 2;

FIG. 4 is an axial section through the scarfing head shown in FIG. 1

Figure 1:
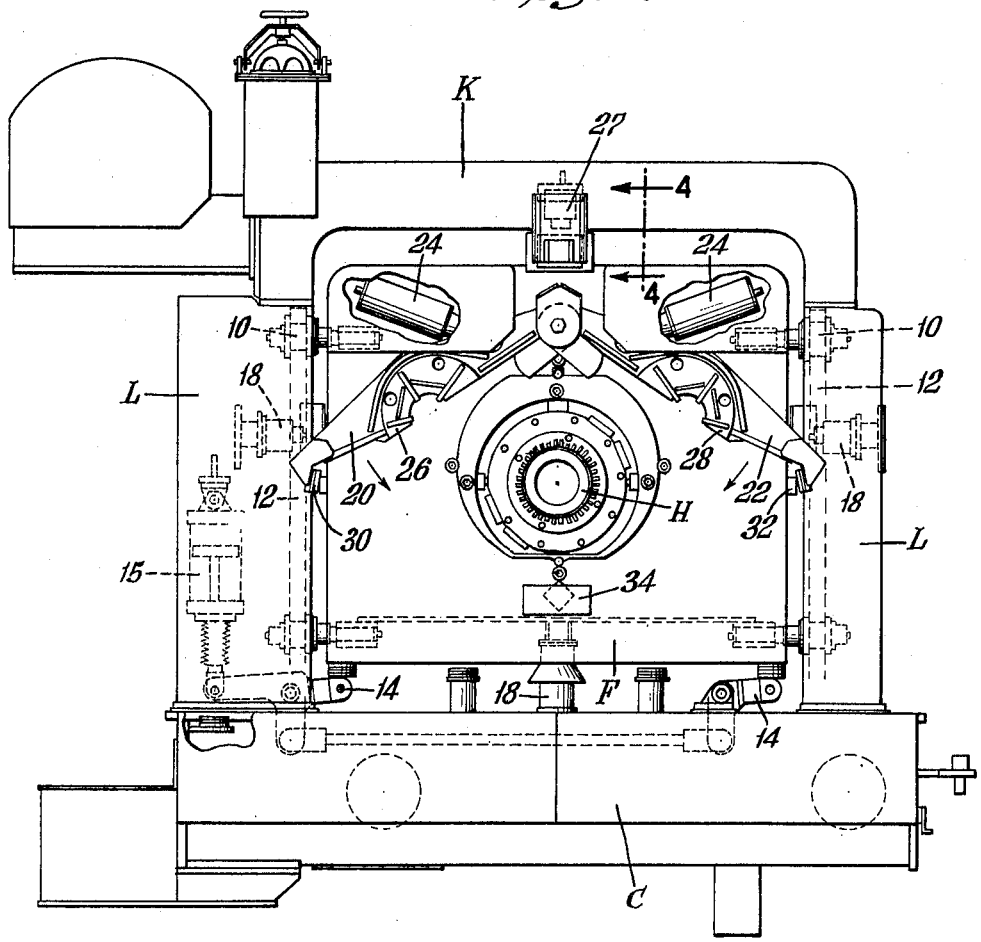
FIG. 1 is a front elevation of a scarfing machine according to, and for carrying out the method of, the present invention.

As shown in FIG. 1, the scarfing machine has a frame comprising a carriage C with two side columns L bridged by a cross beam K. A float panel F is free to move radially with respect to an oncoming round metal bar in a plane transverse to the bar and within the confines of this frame. A conical slot round bar scarfing head H is rigidly mounted in the mid-portion of the panel F to move in unison therewith.

The float panel F is guided vertically by rollers longitudinally slidably journaled on axles secured to the panel, and the rollers engage slots 12 in the columns L. The float panel F is counterbalanced by rocker arms 14 pivoted on the carriage C and connected to a float cylinder 15.

For automatically precentering the float member with respect to a theoretical center line determined by the height and center line of the roll table, the float panel F and attached scarfing head H are precentered by four centering cylinders 18 attached one each to the carriage, cross beam K and the two side columns L. These centering cylinders are actuated by a switch attached to the roll table.

When the oncoming round bar to be scarfed reaches the front pinch roll on the roll table, it trips the switch and the four centering cylinders 18 move into contact with the four sides of the float member F and cause it to move radially into a predetermined theoretically centered position with respect to the next approaching bar.

Pivoted on the float panel F above the center of the scarfing head H are a pair of segmentally separable centering arms 20 and 22 which are actuated by air cylinders 24. Centering guides 26 and 28 are mounted at intermediate portions of these arms for receiving the round bar R, and bumper plates 30 and 32 at the ends of the arms for engaging a stop 34.

As shown in FIG. 2, the centering guides 26 and 28 are provided with guide skids 36 as shown in FIG. 3, which are pivoted as at 38 and adjustable by screws 40, for selective sizing according to the diameter of the bar to be scarfed so as to ensure the proper fit between the bar and the centering device as such device circumferentially engages the bar.

As shown in FIG. 4, the desurfacing head H comprises an inner conical ring 44 secured to an oxygen manifold 52 and a concentric outer ring 45 spaced therefrom and secured to an oxygen manifold mounting plate 48 to provide a conical slot 43 between these conical rings adapted to discharge a conical stream of oxidizing gas in a zone extending around the round workpiece R. The rings 44 and 45 are respectively provided with an annular row of preheat orifices 46 and 47 concentric with the oxidizing gas slot 43.

For centering the scarfing head H around the round bar R after the bar has entered the head, a plurality of pivoted riding skids 55 are spaced around the rear of the head. These skids are swung into position by air operated spring return diaphragm chambers 56. The pivoted movement is limited by a follower button 57 on each skid which stops against a cam 58. A series of such cams for different bar sizes for each skid is mounted on a movable ring 59.

Before the scarfing operation is started, the movable ring 59 is adjusted to bring the proper cam for the bar size to be scarfed beneath the follower button 57 of the respective skids, and the ring 59 clamped in place. When the scarfing operation is begun, the skids 55 are held in a retracted position until the front scarfed surface of the bar passes under the contact surfaces of the skids. Air pressure is then introduced into the diaphragm chambers and the skids are moved into position around the bar to guide the remaining length of the bar.

Before the beginning of the scarfing operation, the air pressure on the float cylinder 15 is adjusted so that the float panel F is in a free floating condition, and the centering arms 20 and 22 are in the closed position for the guides 26 and 28, and skids 36 thereof to receive the oncoming round metal bar to be scarfed. When the round bar R reaches the front pinch roll on the roll table, it contacts a remote control switch which actuates the four centering cylinders 18 on the machine frame, which precenter the float member with respect to the theoretical center line of the approaching bar.

The bar continues down the roll table and contacts the centering guide skids 36. The lead angle on the forward face of these skids 36 facilitates the entry of the round bar R into the opening in the centering guides 26 and 28. The centering cylinders 18 having been released, as the bar contacts the lead angle and slides along the skids, should the bar be slightly off center with respect to the float member F, the bar forces the float member F to reorient itself with respect to the bar. Thus, the scarfing head H which is attached to the float member F directly in line with the centering guides 26 and 28, is precisely centered with respect to the bar.

Figure 5:
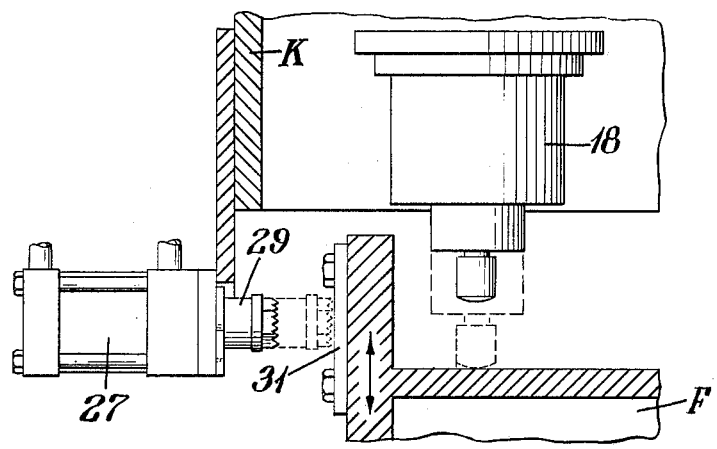
FIG. 5 is a sectional view taken along the lines 4—4 of FIG. 1, illustrating one form of locking means which could be employed with success according to the present invention.

The bar continues its progress through the centering guide 26–28 until it is in position for preheating. The float panel locking cylinder means 27 then locks the float panel F in position, and the segmentally separable centering arms 20 and 22 are retracted. FIGURE 5 illustrates one form of apparatus which could be used as a means for locking the float panel F during the preheating step and for unlocking the panel F after the metal bar has entered the scarfing head H and has engaged the riding skids associated therewith. It is to be understood that the FIG. 5 apparatus is only exemplary of one of many known means for locking a floating panel in position. As shown therein, locking cylinder means 27, which is rigidly mounted to cross beam K, has the end surface of its piston 29 knurled. When the locking cylinder is energized, the knurled end of piston 29 is forcibly pressed against the contact plate 31 fastened to float panel F, which is thereby prevented from floating in any direction. The scarfing operation starts and as the front end of the round bar R passes through the conically slotted nozzle, it contacts the nozzle riding skids 55 which are then automatically contracted around the bar R.

The float panel F is then unlocked by retracting the piston 29 into the cylinder 27 and the riding skids engage the bar and keep the scarfing nozzle unit aligned with the bar during the remainder of the scarfing operation. Thus, the float panel F is free to move in response to any camber of the bar being scarfed. The scarfing operation then continues to the end of the bar. When the entire bar has been scarfed, the scarfing unit skids are automatically retracted by the diaphragm chambers 56 and the centering guide arms 20 and 22 are moved to closed position by the cylinders 24, in which position the arms 20 and 22 remain between scarfing operations to protect the conical slot scarfing head from accidental damage. The machine is then ready to receive the next bar to be scarfed.

What is claimed is:

1. In a machine for receiving and scarfing oncoming round metal bar, a frame; a floating panel floatably mounted in said frame for radial movement with respect to the oncoming round metal bar in a plane transverse to the bar and within the confines of same frame; a scarfing head rigidly mounted in said floating panel, said scarfing head having a plurality of skids associated therewith for circumferentially engaging the round bar during the scarfing operation; segmentally separable centering means mounted upon said panel in front of said scarfing head, said centering means having a plurality of skids for circumferentially engaging the oncoming round bar and for centering said floating panel and said scarfing head with respect to the round bar; and means for locking said panel in said frame after said scarfing head has been centered with respect to the round bar and for unlocking said panel from said frame after the bar has entered said scarfing head and has engaged the skids associated therewith.

2. In a machine for receiving and scarfing round bar as claimed in claim 1, remote control precentering means mounted upon said frame and engaging said floating panel for moving said panel and scarfing head radially in said plane transverse to the oncoming bar, for precentering said panel and scarfing head with respect to the oncoming round bar.

References Cited by the Examiner

UNITED STATES PATENTS

| | | | |
|---|---|---|---|
| 2,221,788 | 11/1940 | Doyle | 266—23 |
| 2,323,977 | 7/1943 | Chelborg et al. | 266—23 |
| 2,509,698 | 5/1950 | Rudisell | 266—23 |
| 2,742,960 | 4/1956 | Smith | 148—9.5 |
| 2,745,475 | 5/1956 | Thompson et al. | 158—27.4 |

FOREIGN PATENTS 625,788   7/1949   Great Britain.

WHITMORE A. WILTZ, *Primary Examiner.*

DELBERT E. GANTZ, MORRIS O. WOLK,
*Examiners.*